Patented Dec. 17, 1929

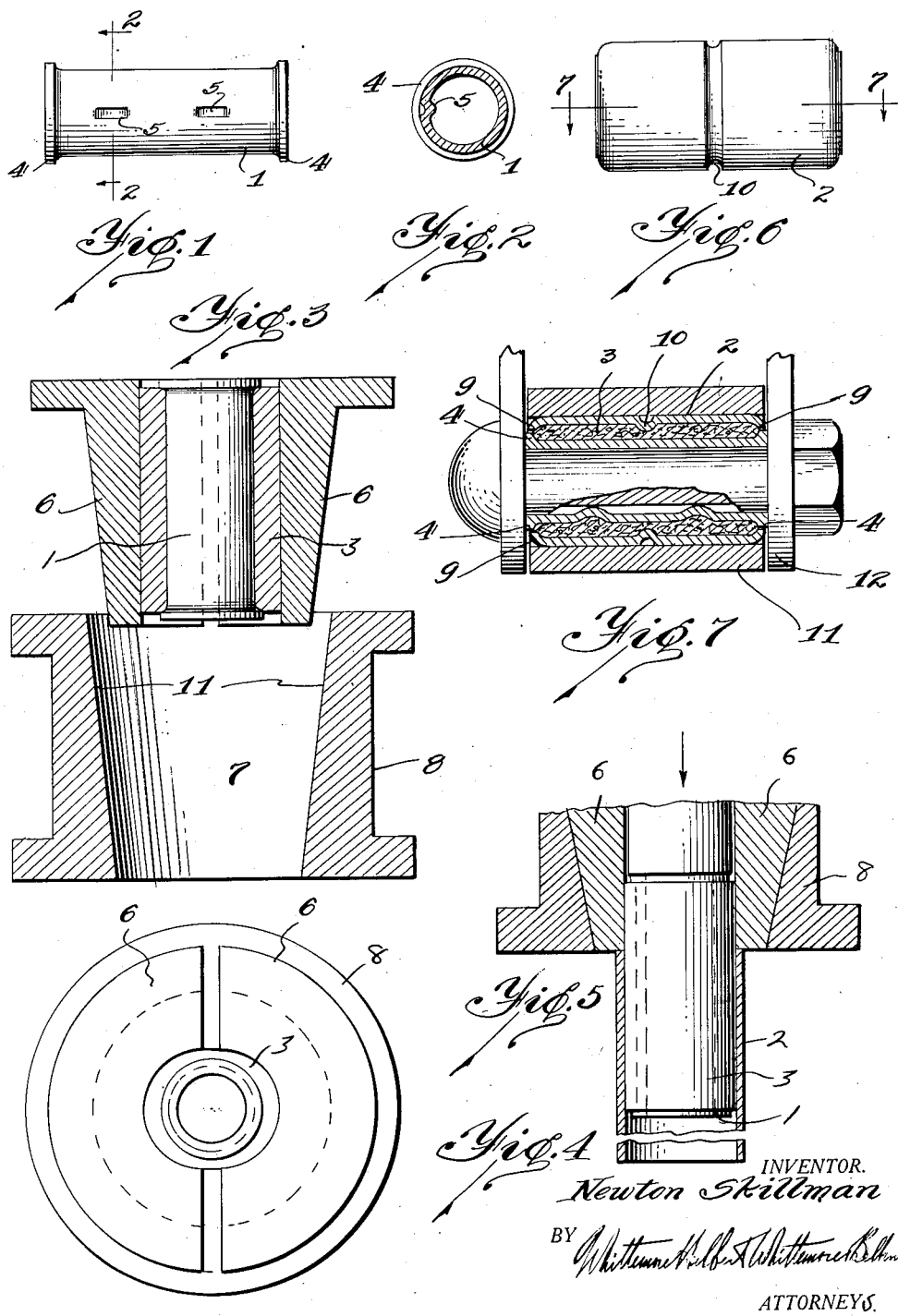

1,739,528

UNITED STATES PATENT OFFICE

NEWTON SKILLMAN, OF HIGHLAND PARK, MICHIGAN, ASSIGNOR TO O. & S. BEARING CO., OF DETROIT, MICHIGAN, A CORPORATION OF MICHIGAN

DOUBLE-END-THRUST SELF-LUBRICATING BEARING

Application filed April 26, 1926. Serial No. 104,735.

The invention relates to bearings and refers more particularly to bearings of that type provided with a lubricant impregnated bushing. The invention has for one of its objects the provision of means upon the inner and outer sections of the bearing for engaging the lubricant impregnated bushing therebetween to hold the sections from relative longitudinal movement in either direction. Other objects of the invention reside in the novel construction of the bearing and the method of making the same.

In the drawings:—

Figure 1 is a side elevation of the inner section of the bearing;

Figure 2 is a cross section on the line 2—2 of Figure 1;

Figures 3 and 5 illustrate certain steps in the formation of the bearing;

Figure 4 is a plan view of the apparatus shown in Figure 3;

Figure 6 is a side elevation of the completed bearing;

Figure 7 is a cross section on the line 7—7 of Figure 6, and showing the bearing in use.

In the present instance I have illustrated a bearing designed for use with shackles of vehicle springs and composed of metallic tubular sections concentrically arranged for relative oscillatory movement, the lubricant impregnated bushing being interposed between these sections. As shown particularly in Figures 6 and 7, 1 and 2 are respectively the inner and outer sections of the bearing and 3 the lubricant impregnated bushing between these sections. This bushing is formed of suitable fibrous material such as asbestos and preferably reinforced by wires extending circumferentially within the asbestos.

The inner section 1 is formed of a steel tube having at its ends the outwardly extending annular flanges 4 and also having the inwardly stamped aligned projections 5 for engaging in a key way or groove formed longitudinally in the member such as a bolt to which the inner section is to be non-rotatably secured. The outer surface of this inner section is highly polished so that the bushing 3 may rotate upon the same.

After the inner section has been formed as above described and shown in Figures 1 and 2, the lubricant impregnated fibrous bushing is then wrapped around the inner section after which the bushing is radially compressed under very high pressure, this being effected as shown in Figures 3 and 4 particularly by placing the inner section with the wrapped around bushing between the segmental compressing sections 6 and then forcing these compressing sections axially into the tapering opening 7 of the die 8. The compressing sections having semi-cylindrical inner faces for engaging the bushing and tapering outer faces corresponding to the tapering wall of the die so that when the compressing sections have been forced axially into the die the bushing is highly compressed.

The inner section with the compressed bushing is then forced axially from the compressing sections into the outer section 2 of the bearing, as shown in Figure 5, this outer section at this time being in the nature of a cylindrical steel tube. As a consequence, the bushing is confined between the inner and outer bearing sections in a highly compressed condition. The inner surface of the outer section is not polished and as a consequence the friction between the bushing and the outer section is greater than that between the bushing and inner section so that upon relative rotation of the sections the bushing rotates with the outer section upon the inner section.

The outer section then has its ends inrolled to form the inturned annular flanges 9 which terminate adjacent to the outer surfaces of the annular flanges 4 of the inner section. Also the outer section is operated upon to form the inrolled annular bead 10 intermediate its ends which with the inturned annular flanges serves to hold the outer section from longitudinal movement relative to the bushing and also to more highly compress the bushing and lock the bushing to the outer section.

As shown in Figure 7, the bearing is used in connecting a vehicle spring 11 to the shackle 12, the inner section 1 extending longitudinally beyond the outer section 2 and having its ends firmly engaging the shackle links so that these links, the inner section and the bolt 13 and nut 14 for securing the links to the inner section move as a unit. The outer section 2, the lubricant impregnated bushing 3 and the spring 12 also move as a unit with the outer section and spring out of contact with the shackle links.

It will also be seen that my bearing has both its inner and outer sections formed with annular flanges extending toward the other section and embracing the lubricant impregnated bushing, which is highly compressed so that these sections are held from relative longitudinal movement. It will also be seen that by reason of inrolling the annular flanges and bear upon the outer section this outer section more filmly engages the bushing and holds the same from rotation relative thereto.

What I claim as my invention is:

1. A bearing comprising an inner tubular section having outwardly extending annular flanges at its ends and an outer polished surface, a compressed lubricant impregnated bushing of fibrous material surrounding said inner section and located substantially between said flanges, and an outer section having a force fit with and surrounding said bushing having inturned annular flanges at its ends engaging said bushing, said bushing being substantially the combined thickness of said two flanges and thereby holding said outer section from longitudinal movement relative to said inner section, the flanges of said inner and outer sections cooperating with each other to further compress the bushing.

2. A bearing comprising an inner section having outwardly extending annular flanges at its ends and an outer polished surface, a compressed lubricant impregnated bushing of fibrous material surrounding said inner section and located substantially between said flanges and an outer section having a force fit with and surrounding said bushing and provided with inturned annular flanges at its ends engaging said bushing and an annular inturned bead intermediate its ends engaging said bushing for additionally compressing said bushing and locking the same to said outer section.

3. The method of forming a bearing which comprises highly compressing a lubricant impregnated bushing of fibrous material around a tubular section, forcing a cylindrical section over the bushing and rolling the end portions and an intermediate portion of the cylindrical section inwardly into firmer engagement with the bushing for additionally compressing the same and for locking the bushing to the outer casing.

4. A bearing comprising inner and outer relatively movable sections, a lubricant impregnated bushing of fibrous material compressed between the adjacent surfaces of said two sections, means upon the ends of said inner section and extending outwardly a substantial distance for engaging said bushing, said bushing having a thickness substantially twice the outer extension of said means, and means upon the outer ends of said outer section and extending inwardly for engaging and further compressing said bushing and locking the outer section in place whereby to prevent relative longitudinal movement between said inner and outer sections.

In testimony whereof I affix my signature.

NEWTON SKILLMAN.